G. W. GRAVES & J. WHITTEMORE.
GLASS GATHERING AND SHAPING MACHINE.
APPLICATION FILED DEC. 7, 1903.

914,823.

Patented Mar. 9, 1909.
8 SHEETS—SHEET 1.

WITNESSES
Jas. P. Barry
H. C. Smith

INVENTORS
GEORGE·WILLIAM·GRAVES·
·JAMES·WHITTEMORE·
BY James Whittemore
ATT'Y.

G. W. GRAVES & J. WHITTEMORE.
GLASS GATHERING AND SHAPING MACHINE.
APPLICATION FILED DEC. 7, 1903.

914,823.

Patented Mar. 9, 1909.
8 SHEETS—SHEET 2.

WITNESSES
Jas. P. Barry
H. C. Smith

INVENTORS
GEORGE·WILLIAM·GRAVES·
·JAMES·WHITTEMORE·

BY James Whittemore ATTY.

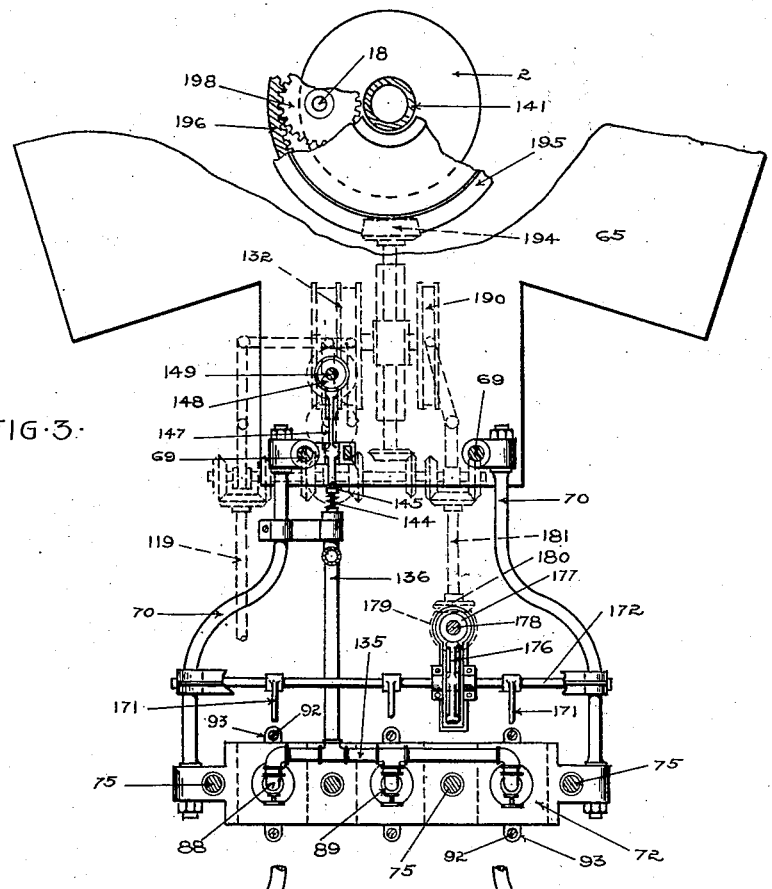

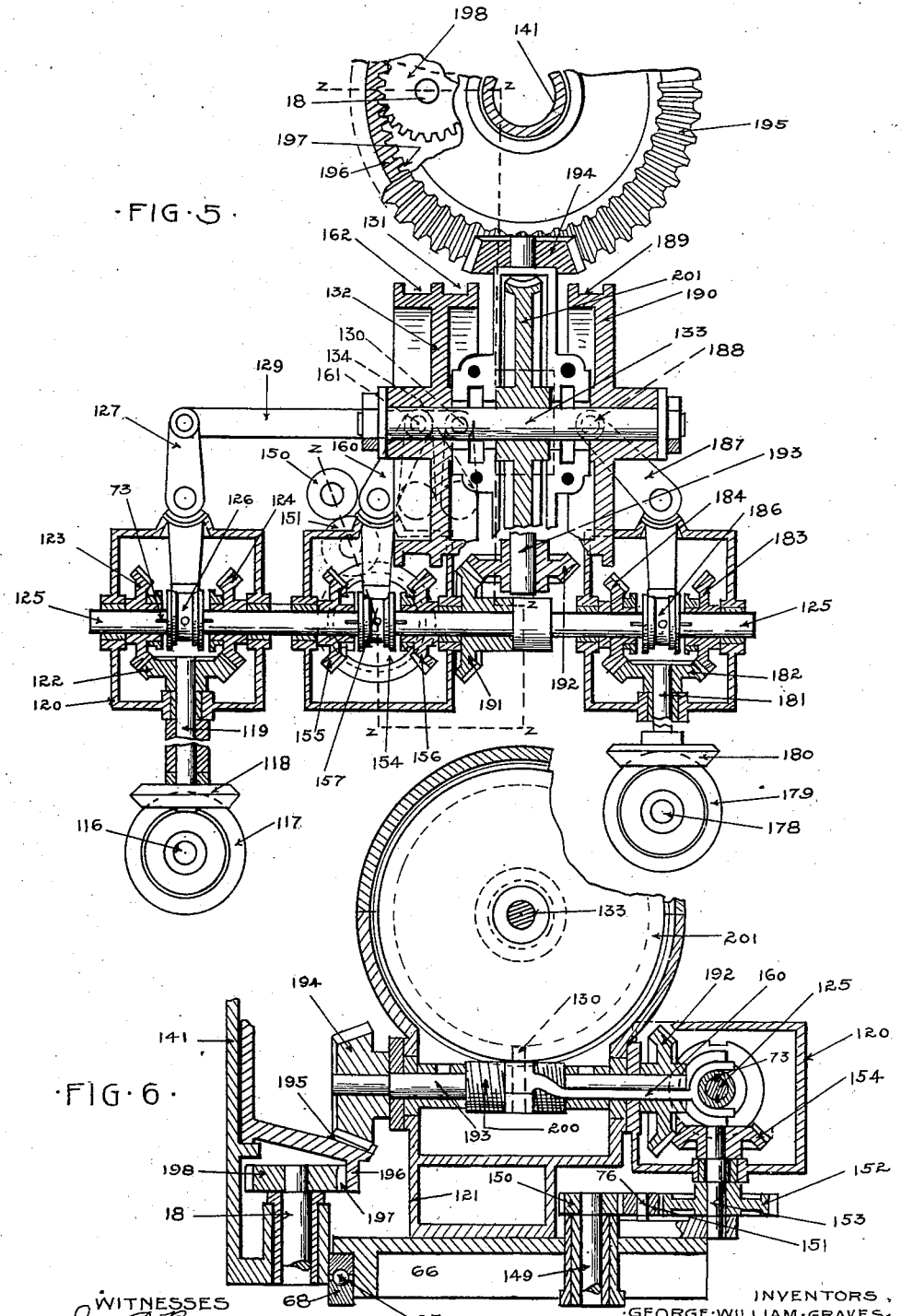

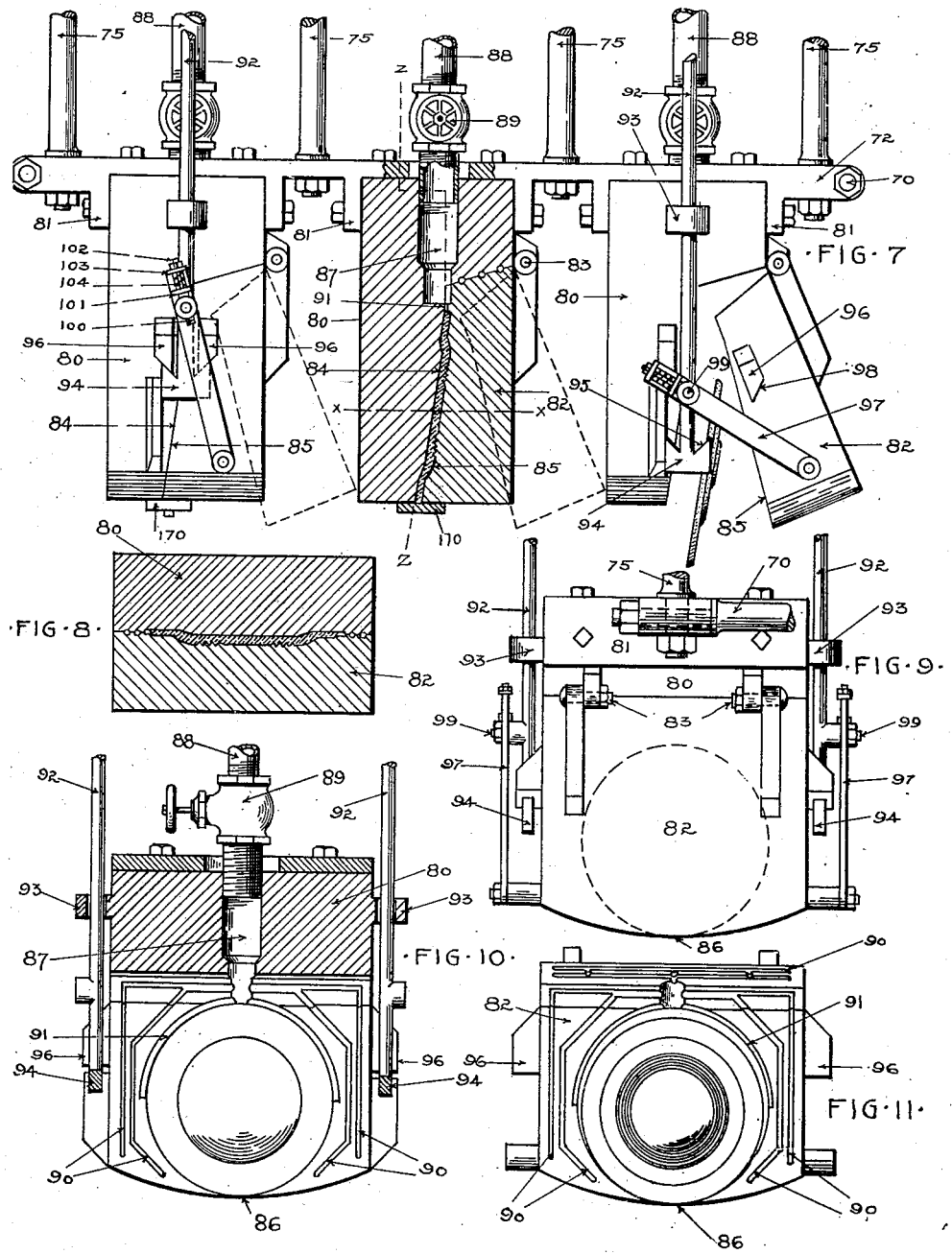

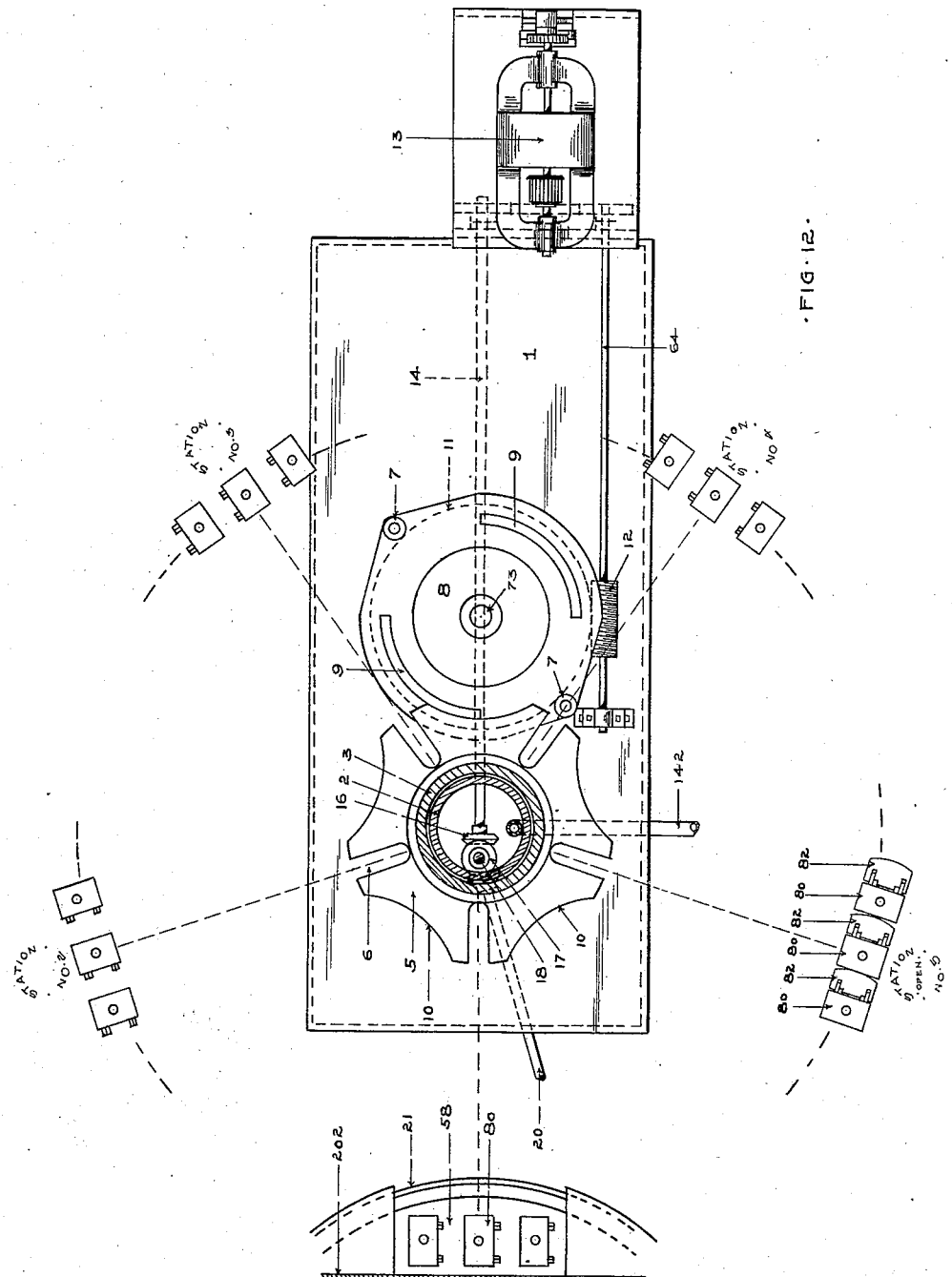

G. W. GRAVES & J. WHITTEMORE.
GLASS GATHERING AND SHAPING MACHINE.
APPLICATION FILED DEC. 7, 1903.
914,823.
Patented Mar. 9, 1909.
8 SHEETS—SHEET 7.
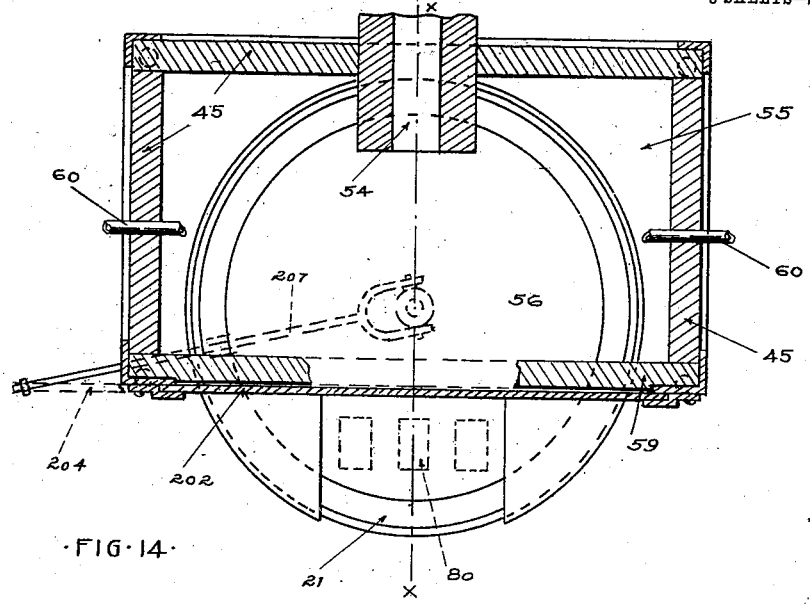
·FIG·14·
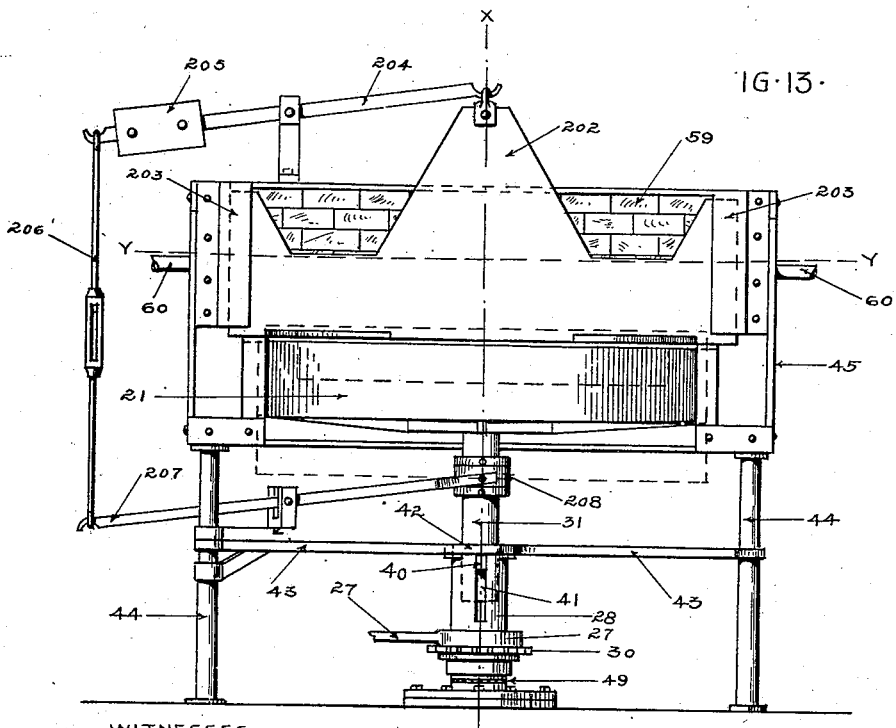
FIG·13·
WITNESSES
Jas. P. Barry
H. C. Smith
INVENTORS
·GEORGE·WILLIAM·GRAVES·
·JAMES·WHITTEMORE·
BY James Whittemore
ATT'Y.

G. W. GRAVES & J. WHITTEMORE.
GLASS GATHERING AND SHAPING MACHINE.
APPLICATION FILED DEC. 7, 1903.

914,823.

Patented Mar. 9, 1909.
8 SHEETS—SHEET 8.

WITNESSES
Jas. P. Barry
H. C. Smith

INVENTORS
GEORGE·WILLIAM·GRAVES·
·JAMES·WHITTEMORE·

BY James Whittemore
ATT'Y.

UNITED STATES PATENT OFFICE.

GEORGE WILLIAM GRAVES AND JAMES WHITTEMORE, OF DETROIT, MICHIGAN, ASSIGNORS, BY DIRECT AND MESNE ASSIGNMENTS, TO THE TOLEDO GLASS COMPANY, OF TOLEDO, OHIO, A CORPORATION OF OHIO.

GLASS GATHERING AND SHAPING MACHINE.

No. 914,823.     Specification of Letters Patent.     Patented March 9, 1909.

Application filed December 7, 1903. Serial No. 184,194.

*To all whom it may concern:*

Be it known that we, GEORGE WILLIAM GRAVES and JAMES WHITTEMORE, residing at Detroit, in the county of Wayne and State of Michigan, citizens of the United States, have invented certain new and useful Improvements in Glass Gathering and Shaping Machines, of which the following is a specification, reference being had therein to the accompanying drawings.

The invention relates to apparatus for manufacturing glass articles, and particularly to a machine comprising a receptacle containing a pool of glass and a mold which is brought into operative relation to the pool of glass and filled therefrom, and in which the article is shaped.

The invention consists particularly in the construction of the mold mechanism whereby solid articles may be completely manufactured by the machine, and in the tank or pool mechanism coöperating with the machine whereby the tank is brought into operative relation to the mold by a movement of the tank or pool in contra-distinction to mechanism heretofore employed in which the mold has been dipped into the glass in the tank.

The invention further consists in the construction, arrangement and combination of the various parts, all as more fully hereinafter described.

Figure 1:
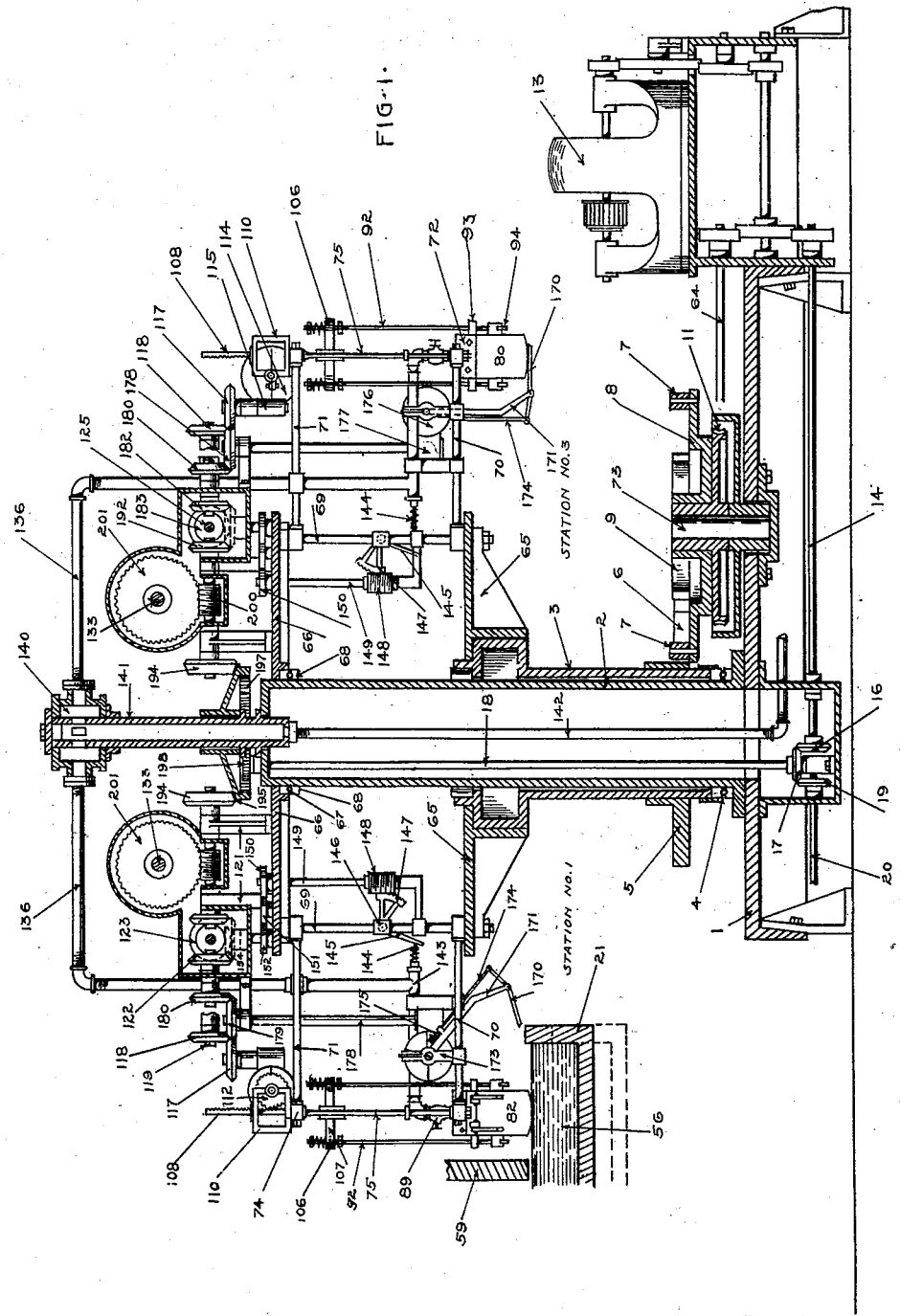
Figure 2:
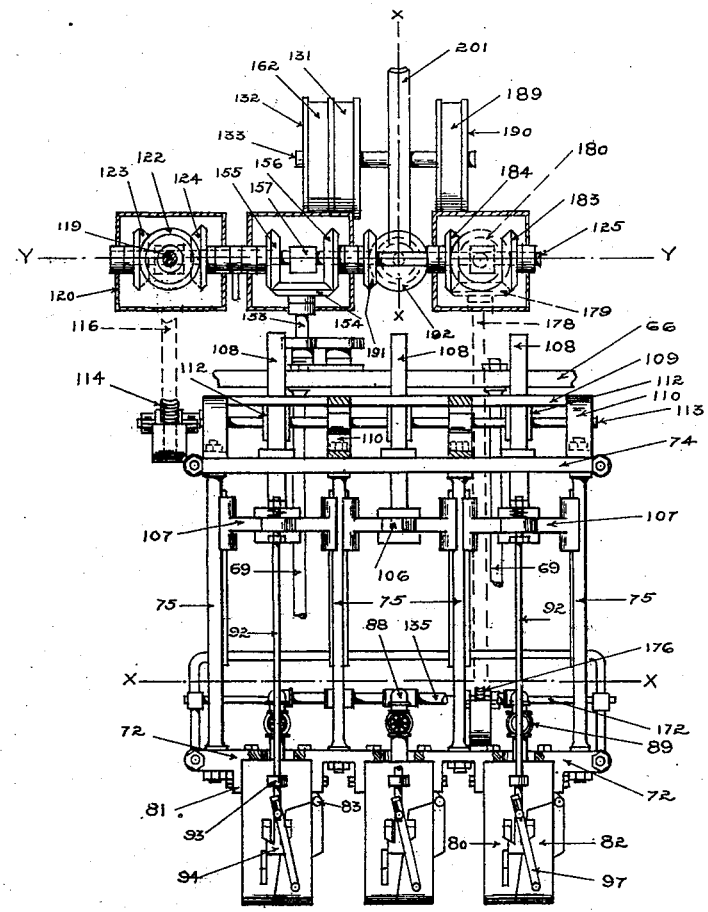
Figures 15, 16:
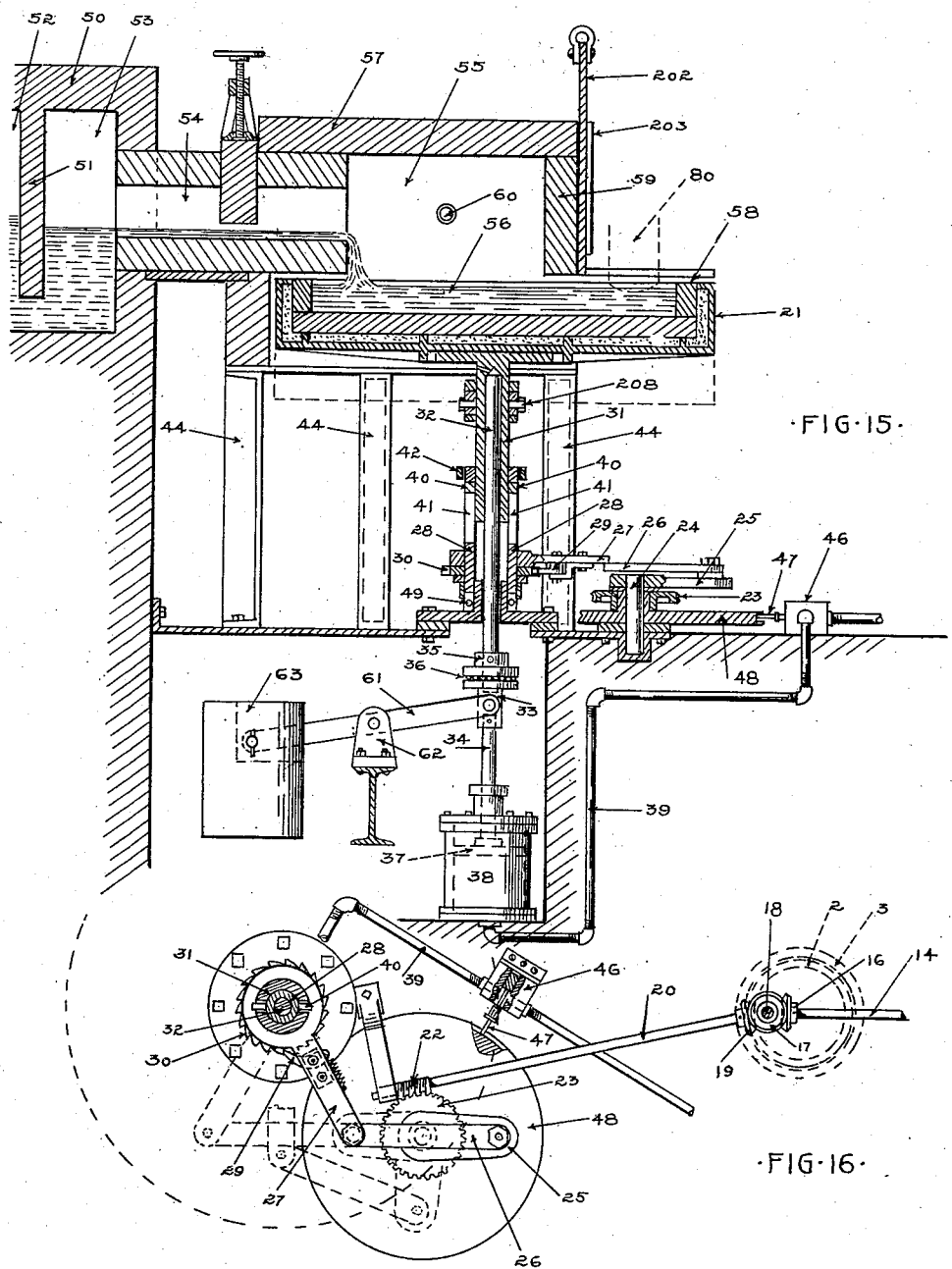

In the drawings Figure 1 is a vertical central longitudinal section through the central standard of the machine and the drive mechanism, the mold arms, the molds, and the actuating mechanism for the molds being shown in elevation. Fig. 2 is a front elevation of the molds and their supports and actuating mechanism therefor. Fig. 3 is a section on line $x\,x$ in Fig. 2, showing in dotted lines some of the actuating mechanism for the molds above the plane of the section, and also showing partially broken away the central standard and the drive connection therefor. Fig. 4 is a detail plan view illustrating the drive mechanism for opening and closing the molds. Fig. 5 is a horizontal section on line $y$—$y$ Fig. 2. Fig. 6 is a vertical section on line $z$—$z$ Fig. 5. Fig. 7 is a front elevation of the molds and mold head, one of the molds being shown in section, and the mold at the right being shown in its open position while the other two molds are shown in their closed position, the open position being indicated by dotted lines. Fig. 8 is a cross section on line $x$—$x$ of Fig. 7. Fig. 9 is a side elevation of one of the molds and the mold head. Fig. 10 is a vertical section on line $z$—$z$ of Fig. 7, showing the interior of one of the molds in elevation. Fig. 11 is an elevation of the other half of the mold. Fig. 12 is a plan view of the base of the machine showing the standard or column in section and indicating in diagram the different positions or stopping points of the molds and the relation between the machine and the tank. Fig. 13 is a front elevation of the tank or glass receptacle. Fig. 14 is a section on line $y$—$y$ Fig. 13. Fig. 15 is a vertical central longitudinal section on line $x$—$x$ Figs. 13 and 14, through the tank, part of the operating device therefor being shown in elevation. Fig. 16 is a plan view of the operating connections for the tank.

1 represents the base of the machine. Near one end of the base we have shown a tubular standard 2 which is stationarily secured to the base.

3 is a tubular standard sleeved about the stationary standard 2 and preferably supported on ball bearings 4 and carrying the operating parts of the machine. This tubular standard with the operating parts may be driven intermittently by any suitable mechanism. The mechanism which we have shown is illustrated particularly in Figs. 1 and 12 and consists of a star wheel 5 secured to the tubular standard 3 and having radial slots 6 with which the roller wrists 7 on the wheel 8 which is secured to the stub shaft 73 which is constantly revolving, are adapted to engage to thereby partially rotate the tubular standard and the operating mechanism. Between the roller wrists 7 are the locking bearings 9 adapted to engage complementary curved bearings 10 on the star wheel 5 to lock the standard 3 and the operating parts in position between the movements thereof. Below the wheel 8 and secured thereto is a worm wheel 11 which is actuated by a worm 12 which may be driven from any suitable source and which in this case we have shown driven through a shaft 64 and a motor 13 on the base of the machine. 14 is a drive shaft for the other operating parts of the machine, and also for rotating the tank as will be hereinafter described. This shaft 14 is driven from the motor 13 by suitable gear connections and extends below the base to a point below the interior of the standard 2, where it is provided with the bevel pinion 16 meshing with the bevel gear wheel 17 on the vertical shaft 18 which extends to the upper end of the standard 2 and connects with drive mechanism for the various parts of the machine as will be hereinafter described. Meshing with the wheel 17 is a gear wheel 19 on a shaft 20 which extends to a point below the tank 21. This shaft has on it the worm 22 meshing with the worm wheel 23 on the shaft 24. On this shaft is a crank arm 25 to which is connected a link 26 which at its opposite end is connected to the pawl carrying arm 27 which is sleeved on the tubular shaft 28, and has upon it a spring pawl 29 adapted to engage with the ratchet wheel 30 secured to the tubular shaft 28. To the under side of the tank is secured a depending tubular shaft 31 in which engages the shaft 32 free to turn therein and the sleeve 28 embraces loosely the tubular shaft 31. The lower end of the shaft 32 engages in a headed block 33 on the piston rod 34 and it is provided near its lower end with a suitable ball bearing between the collar 35 and the headed block 33 as shown at 36. The piston rod 34 has attached to its lower end the piston 37 shown in dotted lines working in a cylinder 38 which is operated by suitable air or steam under pressure being admitted to the lower end of the cylinder through the pipe 39. On the tubular shaft 31 are lugs 40 which engage in vertical slots 41 in the tubular shaft 28 which has roller bearings 49 at its base.

42 is a bearing collar surrounding the shaft 31 which is connected to and supported by the members 43 which extend to the pillars 44 which support the outer casing 45 around the tank.

This construction as will be hereinafter described is intended to raise and lower the tank to and from the molds and after each engagement of the molds with the molten glass in the tank to partially rotate the tank for the purpose of bringing a fresh surface of the glass into operative relation to the molds.

46 is a valve for controlling the air or steam connection 39 and it has a valve stem 47 operated by a cam wheel 48 on the shaft 24.

50 represents a continuous melting tank of any ordinary construction having the partition or wall 51 extending to near the lower portion thereof in the usual manner so that the glass may flow through from the melting portion 52 into the refining chamber 53 and out from the refining chamber 53 through the spout 54 which leads into a chamber 55 above the tank 21, the glass therein being shown at 56.

57 is a casing over a portion of the tank 21 leaving a segment 58 projecting beyond the front wall 59 thereof into which segment the molds may be dipped in a manner to be hereinafter described. As previously described the side walls 45 of this casing are supported on the posts 44 and we may and preferably do provide the gas and air inlet 60 for maintaining combustion in the chamber 55 during the operation of the device.

As the tank with the contained glass is quite heavy it is preferable to counter-weight it and this we may accomplish by means of the counter-weight lever 61 pivoted at one end to the head block 33 and journaled in a bracket 62 and having a counter-weight 63 at the opposite end.

In this construction of machine we have shown the revolving sleeve or standard 3 provided with five sets of like mechanism which are successively brought to the various stations numbers 1, 2, 3, 4 and 5, indicated on the diagram view in Fig. 12, and there remain stationary while one of the sets of molds is being filled at station No. 1. We will describe but a single one of these sets of mechanism as they are all alike and a description of one will answer for the other four.

65 is a bracket secured to the upper part of the standard 3 and 66 is a complementary bracket at the upper end of the standard 2, the bracket 66 being journaled on the standard 2 with interposed ball bearings 67 supported on the collar 68, as plainly shown in Figs. 1 and 6. These two brackets are connected together by the rods 69 at their outer ends. Extending out from the bottom and top of the rods 69 are the arms 70 and 71. The outer ends of the rods 70 supports the cross mold head 72 illustrated in Figs. 1, 2, 3 and 7. The outer ends of the rods 71 are connected by the cross bar 74 the outer ends of the rods 70 are connected by the cross head 72 and the cross bars 74 and head 72 are tied together by the vertical rods 75. These parts thus described and as shown in Fig. 2 comprising the brackets 65, 66, the arms 70, 71 and their connecting cross mold head, cross bar and rods all form a substantially rigid arm or bracket which we will refer to as a whole for convenience as the mold carrying arm.

The molds as will be plainly seen by reference to Fig. 1, Fig. 2 and Fig. 7 are secured to the under side of the cross mold head 72. The molds in this case are shown having a cavity of the proper contour to make what is called a "liner" for fruit jars, the liner being a small circular disk of glass between the metal cap and the upper edge of the jar. Its cross section is shown in the middle view in Fig. 7, and in Fig. 8; its plan view is illustrated in Figs. 10 and 11. We have illustrated in Fig. 7, three of these molds secured to the cross head but as they are all alike a description of one will answer for all.

80 is a stationary mold section which we have shown secured by suitable screws to the lugs 81 on the under side of the cross head 72. It is termed stationary simply because it is not a hinged section.

82 is a hinged section secured to the section 80 by a hinge joint 83.

The inner face of the mold cavity and the mold section 80 is inclined as illustrated at 84 in Fig. 7 and the corresponding face 85 of the hinge section is correspondingly inclined. The purpose of this is so that when the mold is open as shown at the right hand of Fig. 7 the article will drop out without the necessity of having any pushing means for dislodging it. The outer edge of the mold cavity in the two sections terminates at one point at the lower most point of the mold and the face of the mold at this point which we have marked 86 is shaped or curved complementary to the curve of the outer edge of the mold cavity.

At the upper end of the stationary mold section is a suction chamber 87 to which is connected a suction pipe 88 preferably having a valve 89 for controlling the same so that if desired any one of the molds may be cut off in the event that it was not desired to use it without breaking the connection or disturbing the operativeness of the other molds. In the contacting faces of the mold sections we preferably arrange suitable grooves 90 which connect with the vacuum chamber 87 so that any air that may leak in through the joints will be drawn into the vacuum chamber and will not be allowed to enter the mold cavity.

91 is a semicircular groove extending around the upper edge of the mold cavity and connecting at its middle with the vacuum chamber 87. This groove is very narrow so that the air may be drawn therethrough to exhaust the air from the mold cavity and is so small that the glass will not flow therethrough. This particular shape of groove or connection between the vacuum chamber and the mold we do not believe is essential but think it is a good form to employ, as any other connection which will withdraw the air and not allow the glass to flow out of the mold will answer the purpose.

92 are rods guided at their lower ends in the guide blocks 93 at either side of the stationary mold section 80 and having at their lower ends the blocks 94 on the upper face of which and on opposite sides of the rod 92 are the upwardly and outwardly extending inclines 95. On the two mold sections are the lugs 96 having complementary inclines. Pivoted near the lower end of the rods 92 are the links 97 which at their lower ends are pivotally connected with the hinged mold section 82 so arranged that by the downward movement of the rods 92 the mold 82 will be opened as shown at the right hand in Fig. 7 and in the upward movement thereof will be turned to its closed position as shown at the left hand in Fig. 7. In drawing to its closed position the inclines 95 will engage the inclines 98 on the lugs 96 and tightly pull the two sections of the mold together as shown at the left hand of Fig. 7. The pivot pins 99 connecting the links 97 with the rods 92 engage in the slots 100 in the links.

101 are blocks sliding in the slots and bearing against the pivot pins 99. Connected to these blocks are the pins 102 which extend through the slots and through the guide plates 103 at the end of the links 97. Between the blocks 101 and the guide plates 103 in the slots are the springs 104 so that after the rods 92 are moved to bring the mold sections together the rods may move up slightly still further so as to permit of the inclines 95 engaging the inclines 98 on the lugs 96 and tightly pull the two mold sections into contact.

We employ the rods 92 upon both sides of the molds as illustrated in Figs. 1, 9 and 10, but we may employ but a single link 97 on one side of the mold although we have shown the links applied upon both sides as shown in Fig. 9.

The rods 92 at their upper ends slidingly engage through the apertures 106 in the sliding heads 107. These heads 107 slide vertically on the rods 75 and they are reciprocated vertically by the following mechanism.

108 are rack bars which slide in guides in the cross bar 74 and also in the guide in the cross bar 109 secured on top of the cross bar 74 by means of the brackets 110 at the ends and intermediate points thereof. These rack bars are in mesh with the gear wheels 112 on the horizontal shaft 113 which has secured to it the worm wheel 114 with which meshes the worm 115 on the vertical shaft 116 (Figs. 1, 2, and 4). At the upper end of the shaft 116 is secured a bevel pinion 117 which meshes with the bevel gear wheel 118 on the horizontal shaft 119 which is journaled in the gear casing 120 secured on the brackets 121 on the top of the bracket 66. The inner end of the shaft 119 has the bevel gear wheel 122 meshing with the oppositely arranged bevel gear wheels 123 and 124 loose on the shaft 125 which shaft extends horizontally.

126 is a clutch engaging with a key way 73 on shaft 125 journaled on the end of the lever 127 which is adapted to clutch either the gear wheel 123 or 124 to the shaft 125 and drive the shaft 119 and the connections so as to raise and lower the rack bar 108. The lever 127 is connected by a link 129 with a roller wrist 130 which operates in a cam groove 131 in the cam wheel 132 on the shaft 133. In order to steady the roller wrist 130 it is connected with the stationary part of the machine by a pivoted link 134 shown in dotted lines in Fig. 5. The cam groove 131 is shaped so that during the rotation of the cam wheel 132 the clutch 126 will be drawn into engagement at the proper time through the connections described to raise and lower the rack bar 108 and with it the heads 107 to actuate the rods 92 to open and close the hinged sections 82 of the molds and to engage the inclines 95 with the inclines 98 and bind the mold sections together in the closed position as previously described.

The air exhaust or vacuum chamber 87 is connected through the pipe 88 to the cross pipe 135, (Fig. 3) and thence to the common pipe 136 which leads into a chamber in a circular casing 140 which is journaled on the upper end of a vertical stand pipe 141 secured in the upper end of the standard 2 (Fig. 1). From the lower end of the stand pipe 141 a pipe 142 leads downwardly through the standard 2 and at the end connects with any suitable exhaust fan or exhaust pump or any other means for creating vacuum not shown. The chamber in the circular casing 140 as previously described is journaled on the upper end of the stand pipe 141 so that it may rotate with the motion of the machine, the stand pipe 141 being stationary. The exhaust to the mold cavity is controlled by a valve 143 not shown which has a spring actuated stem 144 acting normally to close it, and this valve is opened by the following mechanism. 145 is a bell crank lever journaled at 146 on one of the rods 69. One arm of this lever contacts the stem 144 and the other end is provided with a worm gear segment 147 which meshes with a worm 148 on the vertical shaft 149, (Figs. 1, 3 and 6). At the upper end of the shaft 149 (Fig. 6) is secured the gear wheel 150 which meshes with the idle gear wheel 151 journaled on a stub shaft 76 on the bracket 66 which in turn meshes with a gear wheel 152 on the vertical shaft 153 which at its upper end has the bevel gear wheel 154 meshing at opposite sides with the bevel pinions 155 and 156, on the shaft 125. 157 is an interposed clutch engaging a keyway on the shaft 125 adapted to couple either the pinions 155 or 156 with the gear wheel 154 through the connections described to open the valve and to close it. This clutch is actuated by the lever 160 which at its end has a roller wrist 161 engaging in the cam grooves 162 on the cam wheel 132 previously described.

170 are the cut off knives adapted to operate across the lower face of the molds to cut off the glass in the molds from that in the tank. These knives are secured on the end of the arms 171 which are secured to the shaft 172 journaled in brackets 173 (Figs. 1 and 3). The knives are spring actuated so as to hold them tightly against the face of the molds by means of the rods 174 connecting to the other end of the levers 170 and actuated by springs 175.

On the shaft 172 is secured a worm wheel 176 (Fig. 3) which meshes with the worm 177 on the vertical shaft 178 which at its upper end has the bevel pinion 179 (Figs. 1, 3 and 5) which meshes with the bevel gear 180 on the horizontal shaft 181, the other end of which is provided with a bevel pinion 182 meshing with the bevel gear wheels 183 and 184 loose on the shaft 125. There is an interposed clutch 186 engaging a keyway actuated by the lever 187 which at its end has the roller wrist 188 engaging in the cam groove 189 in the cam wheel 190 secured to the shaft 133 this cam being of such a shape as to operate the clutch 186 to clutch alternatively the gear wheels 183 and 184 to the drive shaft for the purpose of operating the knives across the inlet openings 86 in the molds and withdrawing them therefrom.

The shafts 125 and 133 are operated by the following mechanism. Secured to the shaft 125 is a bevel gear wheel 191 with which meshes the bevel pinion 192 on the shaft 193 (Figs. 5 and 6). This shaft 193 is driven by the engagement of the bevel gear wheel 194 on its end with the bevel gear 195 journaled on the lower end of the stand pipe 141, Figs. 1, 5 and 6. The bevel gear 195 is provided with the downwardly extending flange 196 which is provided with an internal gear 197 which meshes with the drive gear 198 on the shaft 18 previously described, and driven continuously through the connections described from the motor on the base of the machine. On the shaft 193 is a worm 200 which meshes with a worm wheel 201 secured to the shaft 133 so that this shaft 133 and the wheel 201 are driven continuously through the connections already described.

The parts being thus constructed their operation is as follows,—Motion is imparted to the motor 13 which through the construction of the parts shown in Figs. 1 and 12 will intermittently rotate the vertical standard or sleeve 3 and carry with it the brackets 65 and 66 and the various mold supporting arms of which, as previously described, we have shown five in this machine, each mold arm having thereon three molds as illustrated in Fig. 7. The molten glass being melted in the tank 52 will flow from the connection 54 into the rotary tank 21. One of the sets of molds will be located above that part of the tank which projects beyond the front wall 59 as shown in Fig. 15 and through the connections described air will be admitted into the cylinder 38 below the piston, lifting the shaft 32 and with it the tank 21 sufficiently so that the lower edge of the molds will be dipped into the glass in the tank as illustrated in dotted lines in Fig. 15, the mold sections through the connections described, being closed and tightly clamped together as shown at the left hand of Fig. 7 it being understood of course that all three molds over the glass will be in this closed position during this operation. In this position of the parts the knives 170 are withdrawn into the position shown in Fig. 1 (left) which also illustrates the dipping or filling position of the molds. At this point the valve 143 will be moved from its seat just prior to the engagement of the mold with the glass and the air in the molds will be exhausted so that the glass will be drawn into the mold cavity through the opening at the lowermost point of the molds and will fill the same, and as the mold cavity is the shape of the finished article the gathering of the glass into the molds or the filling of the molds from the molten glass will simultaneously shape the finished articles therefrom. The air supply to the lower end of the cylinder 38 being cut off as soon as the molds are filled by shutting off the valve 46, a bleed in the cylinder 38 will allow the piston 37 to lower and with it the tank to the dotted position shown in Fig. 15. As soon as the tank has lowered sufficiently the knives 170 will be reciprocated across the lower face of the molds by the rocking of the shaft 72 through the mechanism described and sever the glass which may be hanging from the inlet of the mold from the glass within the mold 12. The standard 3 will now be caused to partially rotate again through the mechanism described from the position shown in station 1, Fig. 12 to the position marked station 2 in that figure and another set of molds will be brought opposite the tank. The glass articles thus formed in the mold cavities will remain in the molds until they reach the station 5 when the rods 92 will be lowered and the movable mold sections 82 swung out as shown at the right hand in Figs. 7 and 12 opening the molds and allowing the articles to drop therefrom. The inclined faces of the stationary sections of the molds being as shown the article will readily drop out as soon as the molds are open as shown at the right hand of Fig. 7. Before the molds reach the position above the tanks and in moving from station 5 to station 1 the molds will again be closed by the mechanism described before another charge of glass is taken therein.

It will be observed from this construction that instead as hereinbefore has been done of raising and lowering each set of molds to and from the molten glass we have accomplished the dipping of the molds in the glass by the operation of a single device, that is, the tank, this greatly simplifying the construction of the machine. It will also be observed that these "liners" are in the shape of circular disks and the gathering opening in the molds is at one edge thereof which is deemed to be of especial advantage in gathering such articles. It will also be observed that the knives in cutting off across the mold openings cut off in the plane of a portion of the finished article and this is accomplished by having the mold cavities so arranged in connection with the bottom face of the molds that the knives may operate in such a plane.

After each dipping operation of the molds into the molten glass that portion of the glass which has been dipped is caused to move away from the dipping point by a partial rotation of the tank which is accomplished by the mechanism illustrated in Fig. 16 the operation of which has been previously fully described.

In order to prevent the possible loss of heat from the heating chamber 55 through the rotary tank during the time that the tank is in its lower position we may and preferably do provide a sliding gate 202 sliding on the front of the wall 59 in suitable guides 203 so arranged that it will lower as the tank lowers and rise as the tank rises, and thus prevent any larger opening at the front of the tank in the lower position than in the upper position thereof. This may be accomplished by the construction shown in Fig. 13 in which the lever 204 is connected centrally to the gate 202 and provided with the counter-weight 205, this lever in turn being connected by a link 206 with the lever 207 which is connected at its inner end to the sleeve 208 on the sleeve 31 which is raised and lowered with the tank.

What we claim as our invention is,—

1. The combination with a pot or tank adapted to contain molten glass, a mold having an inlet opening and its cavity connected with an air exhausting means, means for bringing the tank and mold into juxtaposition, means for submerging the open end of the mold in the glass in the tank by moving the tank or pot, and means for maintaining the mold in a stationary position during the submerging operation.

2. The combination with a mold of a pot or tank of glass and means for reciprocating the tank to bring the glass in the pot or tank into operative relation with the mold and withdraw the tank therefrom.

3. The combination with a mold of a rotary pot or tank adapted to contain molten glass, of means for reciprocating the tank to bring the glass in the pot or tank into operative relation with the mold and withdraw the tank therefrom, and means for rotating the tank.

4. The combination with a mold, of a rotary pot or tank adapted to contain molten glass, of means for reciprocating the tank to bring the glass in the pot or tank into operative relation with the mold and withdraw the tank therefrom, and means for partially rotating said tank during the period of its withdrawal.

5. The combination of a series of traveling molds, each having an inlet opening, means for maintaining the molds in the same plane and a movable tank adapted to contain molten glass, of means for bringing the molds into juxtaposition to the tank, and means for successively moving the tank to submerge the inlet opening of the mold during its period of juxtaposition and withdrawing the tank therefrom.

6. The combination of a series of molds traveling in a horizontal plane, a tank over a section of which said molds travel, means for dipping the molds successively into the glass while over the tank consisting of means for reciprocating the tank vertically, and means for moving the tank so that successive molds will dip at different points in the tank.

7. In a glass shaping machine, a mold having its cavity of the shape of the finished article and having an inlet opening, suction means for drawing the glass therein, and a cut off operating across the inlet opening to cut off the glass, the cut-off being of a form to shape that portion of the article opposite the inlet opening.

8. In a glass shaping machine the combination of a mold having the cavity the shape of the finished article, and having an inlet opening at a point in a curved surface of the cavity, suction means for drawing the glass therein, a cut off operating across the inlet opening, and a curved surface on the mold beside the opening on which the cut off operates, the cut-off being so arranged and formed that it will shape a complementary portion of the article.

9. In a machine for forming circular disks of glass such as liners for fruit jars, the combination of a mold having a mold cavity the shape of the disk, an inlet opening at a point in the periphery of the disk, and a cut off operating across the inlet opening.

10. In a machine for shaping glass articles, the combination of a traveling head, of the mold sections 80 secured thereto, the section 82 hinged to the section 80, the vertical rod 92, the link 97 connected to the rod and to the hinged section, the reciprocating head 107 connected to the rod, and means for intermittently reciprocating said head 107 to open and close the mold sections.

11. The combination with a mold having an inlet, of a tank, a conduit communicating therewith for supplying molten glass thereto, and means for moving the tank to bring the tank containing the molten glass adjacent to and from the mold, whereby the inlet of the mold is submerged.

12. The combination with a mold having an inlet, of a tank, means whereby the tank may be continuously fed with molten glass, means for moving the tank to bring the tank in registration with the mold, whereby the inlet of the mold is submerged, and means for withdrawing the tank from the mold.

13. The combination with a plurality of separated molds, of a tank for molten glass common to all of them, means for successively moving the tank to bring the glass and the respective molds in juxtaposition, and for presenting a fresh surface of the glass to the respective molds.

14. The combination with a mold, of a pot or tank of glass, and pneumatic actuated means for reciprocating the tank to bring the same into operative relation with the mold and withdraw it therefrom.

15. The combination with a mold, of a tank of glass, and automatically operable means for reciprocating the tank at predetermined intervals to bring the same into operative relation with the mold and withdraw the same therefrom.

16. The combination with a mold, of a rotary pot or tank for molten glass, means for reciprocating the tank to bring the glass in said pot or tank into operative relation with the mold, and automatically operable means for rotating the tank.

17. The combination with a mold, of a rotary pot or tank for molten glass, means for reciprocating the tank to bring the glass in said pot or tank into operative relation with the mold, and automatically operable means for rotating the tank at predetermined intervals.

18. In a machine of the character described, the combination of a mold support, a mold thereon, a tank for molten glass, means for reciprocating the tank to bring the glass into operative relation to the mold, and means for automatically filling said mold, when said tank and mold are in operative relation.

19. In a machine of the character described, the combination of a traveling mold support, a series of separated molds thereon adapted to move into operative relation to a common tank containing glass, said tank, and means for moving said tank whereby a fresh surface of said glass will be presented to each successive mold.

20. In a machine of the character described, the combination of a traveling mold support, a series of connected molds thereon adapted to move into operative relation to a tank containing glass, means for imparting movement to said tank whereby the molds are respectively submerged, means for automatically filling the molds, a cut-off for the molds having a common actuating means, and said actuating means.

21. In a machine of the character described, the combination with a traveling mold support, of a series of separated molds thereon, a tank for molten glass, automatic means for moving the tank into operative relation to the molds, and means for imparting movement to the tank whereby a fresh surface of the glass will be presented to each successive mold.

22. The combination with a mold, of a tank, and means for imparting a vertical reciprocatory movement to the tank to bring the tank containing the molten glass adjacent to and from the mold, the mold remaining stationary relative to said movement of the tank.

23. The combination with a mold, of a pot or tank of glass, and means for reciprocating the tank to bring the glass in the pot or tank into operative relation with the mold and withdraw the tank and glass remaining therein away from the mold.

24. The combination with a series of molds, of a rotatable support therefor, a tank containing molten glass and common to each of said molds, and means for imparting vertical reciprocatory movement to said tank whereby the same is brought into operative relation with each successive mold.

25. The combination with a mold, of a tank containing molten glass, said tank and mold having a reciprocal movement relative to one another, and means for imparting rotary movement to said tank.

26. In a gathering and shaping machine, the combination with a traveling mold support of a gang of connected molds thereon, a tank containing molten glass, means for imparting reciprocatory movement to the tank to bring the same into operative relation with said gang of connected molds, means for automatically filling said molds simultaneously, a cut off for all of said molds, a common actuating means for said cut off, and means for opening and closing the mold.

27. The combination with a mold, of a rotary pot or tank for molten glass, and means for reciprocating the tank to bring the glass in said pot or tank into operative relation with the mold.

28. The combination with a mold, of a tank containing molten glass, said tank having a reciprocal movement relative to the mold, and automatically operable means for imparting rotary movement to said tank.

29. The combination with a plurality of connected molds, of a tank capable of containing a sufficient quantity of molten glass for a plurality of said molds, and means for imparting a vertical reciprocatory movement to the tank to bring the tank containing the molten glass adjacent to and from the molds.

30. The combination with a mold, of a tank containing molten glass, means for reciprocating the tank to and from the mold whereby the inlet end of the latter is submerged, and means connected with the mold for drawing the glass thereinto.

In testimony whereof we affix our signatures in presence of two witnesses.

GEORGE WILLIAM GRAVES.
JAMES WHITTEMORE.

Witnesses:
JAS. P. BARRY,
EMMA I. BARNES.